US011157591B2

(12) United States Patent
Adams et al.

(10) Patent No.: US 11,157,591 B2
(45) Date of Patent: Oct. 26, 2021

(54) ASYNCHRONOUS STATIC ANALYSIS SYSTEM FOR A COLLABORATIVE SOFTWARE DEVELOPMENT ENVIRONMENT

(71) Applicants: Atlassian Pty Ltd., Sydney (AU); Atlassian Inc., San Francisco, CA (US)

(72) Inventors: Mark Adams, San Francisco, CA (US); Chris Walz, Austin, TX (US); Ming Chang, San Francisco, CA (US); Erin Jensby, Plano, TX (US); Robbie Gallagher, Austin, TX (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 16/854,593

(22) Filed: Apr. 21, 2020

(65) Prior Publication Data
US 2021/0200834 A1   Jul. 1, 2021

Related U.S. Application Data

(60) Provisional application No. 62/954,999, filed on Dec. 30, 2019.

(51) Int. Cl.
*G06F 16/958* (2019.01)
*G06F 16/25* (2019.01)
*G06F 16/51* (2019.01)

(52) U.S. Cl.
CPC .......... *G06F 16/972* (2019.01); *G06F 16/252* (2019.01); *G06F 16/51* (2019.01)

(58) Field of Classification Search
CPC ....... G06F 16/972; G06F 16/51; G06F 16/252
USPC ....................................................... 707/736
See application file for complete search history.

(56) References Cited

U.S. PATENT DOCUMENTS

| 8,806,450 | B1* | 8/2014 | Maharana | G06F 11/3688 717/133 |
| 2005/0015675 | A1* | 1/2005 | Kolawa | G06F 11/3688 714/38.14 |
| 2015/0096022 | A1* | 4/2015 | Vincent | G06F 21/562 726/23 |
| 2015/0268939 | A1* | 9/2015 | Kelapure | G06F 8/75 717/112 |
| 2016/0092336 | A1* | 3/2016 | Atanasiu | G06F 8/35 717/133 |
| 2018/0196731 | A1* | 7/2018 | Moorthi | G06F 11/3688 |

* cited by examiner

*Primary Examiner* — Robert W Beausoliel, Jr.
*Assistant Examiner* — Arthur Ganger
(74) *Attorney, Agent, or Firm* — Brownstein Hyatt Farber Schreck, LLP (57) ABSTRACT

A collaborative software development environment includes a centralized repository security service that monitors a repository database of the collaborative software development environment for change notifications or events. When a change is noticed (e.g., pull request), the source repository is cloned and suitable images are spun up by an orchestrator, each of which is configured to perform a static analysis operation against the source code of the cloned repository. Results of each static analysis operation are stored in a database that can be accessed by client devices.

20 Claims, 7 Drawing Sheets

ASYNCHRONOUS STATIC ANALYSIS SYSTEM FOR A COLLABORATIVE SOFTWARE DEVELOPMENT ENVIRONMENT

CROSS-REFERENCE TO RELATED APPLICATION(S)

This application is a nonprovisional patent application of and claims the benefit under 35 U.S.C. § 119(e) of U.S. Provisional Patent Application No. 62/954,999, filed Dec. 30, 2019 and titled "Asynchronous Static Analysis System for a Collaborative Software Development Environment," the disclosure of which is hereby incorporated herein by reference in its entirety.

TECHNICAL FIELD

Embodiments described herein relate to collaborative software development environments and, in particular, to systems and methods for asynchronously performing static analysis on a clone of a given code repository in response to one or more repository event triggers.

BACKGROUND

An organization can deploy a collaborative software development environment to facilitate completion of work by a team of developers to advance a common software development goal. Many teams also encourage individual developers to install and configure, on local development workstations, one or more static analysis tools to identify coding errors and/or omissions.

However, conventional static analysis tools operate only on a limited set of programming languages or syntaxes and, as a result, development teams are required to select, configure, and maintain suitable static analysis tools installed on, or accessible to, each workstation of each developer on that team. For large software development projects supported by a large team of developers, such a task is often burdensome to complete, and, as a result, a substantial number of software development teams entirely forgo use of any static analysis tool, accepting the risk that coding errors and/or omissions may exist, undetected, in their work product.

SUMMARY

Embodiments described herein may relate to, include, or take the form of a system for asynchronous static analysis of a source repository stored by a repository service of a collaborative software development environment. The system can include at least (1) a repository service with a repository database that stores a source repository and (2) a repository security service communicably coupled to the repository service.

The repository security service can be configured to, without limitation: clone a selected branch of the source repository from the repository database to a local directory as a cloned repository; analyze the cloned repository to determine at least one computing language used by the cloned repository; select at least one image from an image database (each selected image packaging a respective one static analysis tool configured to perform a static analysis operation against the at least one computing language); provide as input to each selected image a pointer to the local directory; instantiate each selected image to initiate each respective static analysis operation against the cloned repository; and store results of each respective static analysis operation in a result database.

Embodiments may include a configuration in which the repository security service is configured to communicably couple to a client application executed by a client device, the client application configured to submit a request to the result database to display at least one result of at least one completed static analysis operation in a graphical user interface of the client device.

Embodiments may include a configuration in which the repository security service is configured to receive a repository event from the repository service indicating a change has been made to the source repository. In these examples, the repository event indicates the selected branch. The repository event can include one or more of a pull request, a merge, or a commit and/or may include a payload that indicates the selected branch.

Embodiments may include a configuration in which analyzing the cloned repository to determine the at least one computing language used by the cloned repository includes determining a file extension of at least one file of the cloned repository.

Embodiments may include a configuration in which the repository security service may be configured to display results of each static analysis operation to a user of the system via a display of a client device communicably coupled to the repository security service.

Embodiments described herein may relate to, include, or take the form of a method for triggering static analysis of a repository, the method including the operations of: detecting a change to the repository; cloning the repository to a local directory; accessing the local directory with a first service; analyzing, with the first service, at least one respective file in the cloned repository to determine a respective code type of the at least one respective file; assigning a tag, by the first service, to the at least one respective file based on the respective code type; instantiating a second service selected at least in part based on the tag; determining, by the second service, for each at least one respective file in the cloned repository, whether the at least one respective file contains a software issue; and storing each determined security vulnerability in a database.

Embodiments may include a configuration in which the first service includes a data detector configured to determine a computing language of the at least one respective file. In such examples and other related implementations, the tag may be based on the determined computing language.

Embodiments may include a configuration in which the second service is a containerized static analysis tool configured to perform static analysis of source code files of the respective code type of the at least one respective file.

Embodiments may include a configuration in which the second service is instantiated by an orchestrator that receives as input the tag and selects an image corresponding to the tag from an image database, the image with instructions to instantiate the second service.

Embodiments may include a configuration in which detecting the change to the repository includes receiving an event with a pull request.

Embodiments may include a configuration in which cloning the repository to the local directory includes pulling one or more changes associated with the pull request to the local directory.

Embodiments may include a configuration in which analyzing, with the first service, the at least one respective file in the cloned repository to determine the respective code type of the at least one respective file includes determining a file extension of the at least one respective file.

Embodiments described herein may relate to, include, or take the form of a system for asynchronous static analysis of a source repository, the system including at least: an event queue for receiving a repository event indicating a change to the source repository; a data detector service for determining a computing language used by the source repository indicated by the repository event; an image store configured to store images, each image packaging a respective static analysis tool configured to perform a respective static analysis operation against at least one computing language; an orchestrator for selecting at least one image from the image store in based on the computing language used by the source repository as determined by the data detector service, the orchestrator further configured to instantiate each selected image such that each instantiated image initiates the respective static analysis operation against the source repository; and a result store for receiving and storing results of execution of each initiated respective static analysis operation.

Embodiments may include a configuration in which the results of execution of each initiated respective static analysis operation are normalized to a common format prior to storing in the result store.

Embodiments may include a configuration in which the data detector service may be configured to clone the source repository to a local directory prior to determining the computing language used by the source repository indicated by the repository event.

Embodiments may include a configuration in which the repository event may be received from a repository service in communication with the event queue.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

This application relates to collaborative software development environments and, in particular, to a centralized system for performing asynchronous repository-specific static analysis in a manner that does not block or interrupt individual developer's or teams' continuous integration (or other) workflows, does not require installation or configuration or operation of any discrete static analysis tool on any individual developer's workstation, and can be easily and efficiently maintained and updated.

An example collaborative software development environment (also referred to as a source-control management system), as described herein, is a code repository that can be implemented in whole or in part as software executed by one or more virtual or physical server(s) or other computing appliances or communicably coupled combination of appliances that provides a team of individuals with a centralized or federated system for communicating and exchanging information and maintaining version control over shared source code related to one or more software products.

A collaborative software development environment may be configured to enforce version control over different code repositories, each of which may be associated with one or more branches that can be checked out, forked, cloned, or otherwise modified by one or more members of a software development team. In addition, a collaborative software development environment, such as described herein, may be configured to receive pull requests and commits from individual developers or teams that introduce one or more changes to a given code repository.

One of skill in the art may appreciate that a collaborative software development environment, such as described herein, can be implemented in a number of suitable ways to conform to a number of open or closed source version control protocols or techniques and, as such, it is understood that as used herein the phrase "collaborative software development environment" is used to refer to any and all software platforms and systems, whether centralized or distributed and whether implemented with a client-server architecture or whether implemented to support complete local repositories, that are configured to facilitate (at least) version and/or source control of any number of software projects and that can be configured to receive contributions, commits, pull requests, forks, merge requests, and other commands or instructions by any number of developers.

For simplicity of description, the embodiments that follow reference an example collaborative software development environment that implements Git, and commands and functions associated therewith. However, it is appreciated that is merely one example distributed version control technique/system and other implementations and protocols, whether centralized or distributed, are equivalently applicable to benefit from and/or otherwise leverage the systems and methods described herein, especially as it relates to centralized repository security service(s) described below.

In many examples, a collaborative software development environment, however configured or used by a team of individuals or an organization, can be implemented at least in part with a client-server architecture in which a host server or service of the collaborative software development environment exchanges or otherwise operates with webhooks, requests, or responses (over one or more communication protocols such as HTTP, TCP, UDP, and the like), with one or more client devices, each of which may be operated by a user/developer of the collaborative software development environment.

In these examples, client devices can communicably couple to the host server in order to retrieve copies of all or some source code (e.g., clone, fetch, and so on), to request actions to be performed to source code (e.g., pull requests, merge, and so on), or to perform any other version control or software development related task. In many examples, a client device may be configured to maintain a local copy of a code repository, or a portion thereof, such that a developer can modify local software source code, save version-controlled changes (e.g., commit) to a local database associated with the collaborative software development environment and perform other software development and/or version control related tasks.

To facilitate these and other operations, client devices such as described herein can be configured to leverage a processor (or more than one processor or processing element) to execute one or more instructions stored in a non-volatile memory of the client device to instantiate an instance of a client application associated with, and configured to, communicably couple to the collaborative software development environment or, more specifically, the host server of the collaborative software development environment.

In other cases, a client device may not be configured to instantiate a client application but, instead, may be configured to access and exchange information with the host server in another manner, such as via a web browser or other intermediary or general-purpose application. For simplicity of description, the embodiments that follow reference a configuration in which each user/developer of a team of users/developers leveraging a collaborative software development environment, such as described herein, operates a respective client device that, in turn, executes and/or instantiates a respective instance of the same client application; it is appreciated, however, that this is merely one configuration and other implementations may be different and may not require local instances of client applications.

Phrased in another non-limiting manner, in many embodiments described herein, each developer of a team uses personal computing hardware (e.g., a laptop, table, or desktop computing device) executing a local instance of a client application to communicate with a collaborative software development environment. In such examples, the local instance of the client application facilitates communication between the user/developer and the host server of the collaborative software development environment or, alternatively or additionally, facilitates communication between the user/developer and other users/developers each operating their respective own instances of the client application on their own respective client devices. More specifically, each local instance of the client application can cause to be generated on a display of the respective client device a graphical user interface configured to present information to, and solicit input from, the user/developer. In this manner, the client device and, in particular, the local instance of the client application serves as an interface between the user/developer and the collaborative software development environment.

As a result of this architecture, a developer can utilize a local instance of the client application to clone a repository stored in a database of a host server of a collaborative software development environment, such as described herein. Thereafter, the developer can make changes to a specified branch of the cloned repository (herein, "local source code") and commit those changes to a local database without affecting any branch or source code of the repository stored in the database of the host server. Once the developer is satisfied with changes made to the local source code, that developer can submit a pull request to the host service of the collaborative software development environment, after which the developer's revisions, reversions, additions, comments, and/or other changes may be reviewed (e.g., by other members of the software development team) and considered for merging with a master, production, or other branch or fork of the repository stored in the database of the host server.

Embodiments described herein further include a centralized repository security service. The centralized repository security service can be a portion, module, or subsystem of the host server or, in other embodiments, can be implemented in whole or in part as software executed by one or more virtual or physical server(s) or other computing appliances or communicably coupled combination of appliances.

For simplicity of description, the embodiments that follow reference an example centralized repository security service as a subservice of the host server, but it is appreciated that this is merely one example configuration and that in other embodiments, a centralized repository security service, such as described herein, can be separate and distinct from a host server, such as described herein.

A centralized repository security service, in many embodiments, implements an event-driven architecture to listen for one or more "repository events" performed by, reported by, or otherwise received by, the host server. Example repository events (which may be repository specific) include, but may not be limited to, notifications corresponding to creation, deletion, or modification of: pull requests; merges; fetches; forks; branches; commits; commit comments; wiki pages; issues; labels; tags; members; organizations; memberships; projects; packages; publications; stars; cross-links; teams; and so on.

The repository event(s)s may be received, enqueued, sent, or stored in any suitable form or format but, in many embodiments, are reported to all subscribers of a webhook or other API provided, or served, by the host server. In many embodiments, although not required, a repository event can include a payload with information identifying the event, an event type, and/or descriptive information corresponding to the repository originating the event.

Once the centralized repository security service receives a repository event of a specified type (or one of a set of specified repository event types), the centralized repository security service is configured to clone the repository identified by the repository event to a directory (or other addressable location) local to the centralized repository security service.

Thereafter, the centralized repository security service is configured to leverage a data detector service to determine what coding language(s)/syntax(es) are used in the cloned repository. In other cases, the centralized repository service can leverage the data detector service to tag or otherwise categorize the cloned repository. The data detector service can leverage any suitable method to determine a statistically likely coding language and/or syntax (also referred to as "language identification") used in the cloned repository including, but not limited to: determining file extensions; leveraging regular expressions for known syntax types; leveraging trained predictive models/artificial intelligence algorithms; and so on. In other cases, the data detector service can be further configured to determine dependencies listed or otherwise referenced in a given source file. In still further examples, the data detector service can be further configured to determine one or more properties or metadata characteristics of the cloned repository such as file size, folder size, project size, number of files, file type combinations (e.g., proportions of one file type in relation to others), and so on.

After obtaining information with confidence about the language(s) and/or syntax(es) used in the cloned repository, the centralized repository security service accesses a container/virtual machine image store ("image store") that stores a number of images (or container orchestration instruction files) of static analysis tools, each of which once instantiated is configured to perform static analysis of a given subset of coding languages or syntaxes.

The images or virtual machines may be discrete files or disk image files that, when accessed by a processor of the centralized repository security service, instantiate a container or virtual machine configured to perform one or more static analysis operations or tasks. For simplicity of description, the term "image" is used herein to refer to container images, virtual machine images, or any other suitable containerization, emulation, virtualization, or other software bundling, encapsulation, or sandboxing technique (and any associated configuration files, libraries, or dependencies) that can be used to package a software product in a manner that minimizes runtime dependencies as much as possible.

The image store of the centralized repository security service may include a database column that provides information about a particular image. For example, images may be tagged with static analysis function names (e.g., what functions the imaged static analysis tool provides), supported languages, version numbers, and the like. In other examples, the centralized repository security service may be configured to identify the configuration and function of images stored in the image store in another suitable manner.

The static analysis tools packaged by the images stored in the image store may be first-party tools or third-party tools. As used herein, the phrase "static analysis tool" refers to any package, script, or other functional unit of computer software that is configured to identify, typically on a line-by-line basis, coding errors and/or omissions that introduce one or more information security issues, style conformity issues, safety issues (especially for software that controls hardware), consistency issues, package/framework/library depreciation issues, software vulnerabilities, and the like.

For example, a static analysis tool may be configured to identify, without limitation: database injection; cross-site scripting errors; depreciated, unpatched, or otherwise insecure authentication management; depreciated, unpatched, or otherwise insecure session management; depreciated or insecure token generation or storage; memory overflow errors or risks; misconfigured or improperly called or included packages, imports, frameworks, or libraries; information leakage (e.g., improperly-scoped variables, unintended logging or printing, and so on); path traversal or enumeration errors; user interface injection (e.g., clickjacking, touchjacking, and so on); response splitting; man in the middle exposure risks; insecure transport layer issues; incorrect or unintended session expiration errors; comments containing sensitive or private information; password or username logging or printing; privilege escalation risks; remote file linking; file permission errors; and other common security or information vulnerabilities. In some embodiments, a static analysis tool may be further configured to determine, without limitation: syntax errors; coding errors; inefficient algorithms; inefficient or slow API calls; variable naming convention compliance; comment format convention compliance; coding style/convention compliance; file name convention compliance; folder structure convention compliance; commit comment length or content requirements; and so on.

It may be appreciated that the foregoing example vulnerabilities and other software issues that may be identified by a first-party or third-party static analysis tool, such as described herein, is not exhaustive. To the contrary, it is appreciated that any suitable static analysis tool may be configured to detect any suitable undesirable condition of a software product, whether that condition relates to information security, software vulnerabilities, organization-specific or team-specific style guidelines, industry-standard style guidelines, open source license compliance checking, and so on.

For simplicity of description, the term "issue" is used herein as a blanket term to refer to any output of a static analysis tool that identifies from a given input code repository (such as the cloned repository referenced above) a file, a line, or a substring of a line (e.g., variable name) that exposes a vulnerability, style nonconformity, or information disclosure and that should be corrected or otherwise addressed. Phrased in another manner, static analysis tools as described herein are configured to identify "issues" with software, and in some cases, additionally provide suggestions and/or descriptions of any identified issues. In some embodiments, a static analysis tool may be further configured to automatically correct certain identified issues and submit a pull request including those corrections.

In addition, it may be appreciated that any one static analysis tool packaged by an image stored in the image store may be suitably configured to analyze one or more computing languages or syntaxes. For example, a first static analysis tool may be configured to detect security issues in Java code, whereas a second static analysis tool may be configured to detect style issues in Python code, whereas a third static analysis tool may be configured to detect style issues, security issues, and depreciated frameworks in both Python and Java code.

For simplicity of description, the embodiments that follow reference static analysis tools that each are independently configured to operate against a single language and configured to detect information security issues and security vulnerability issues. It is appreciated, however, especially in view of the foregoing, that these are merely examples; in other cases, a single static analysis tool may be suitable to detect a multitude of information disclosure, style conformity, and security issues across many languages, language versions, and file formats. Similarly, although many embodiments described herein reference static analysis tools, it may be appreciated that image store may also store images configured for dynamic or runtime analysis. For simplicity of description, however, the embodiments that follow reference only static analysis tools, but it may be appreciated that this example does not limit the scope of function that may be provided by a centralized repository security service, such as described herein. More specifically, it is appreciated that a centralized repository security service, such as described herein may include an image store storing images configured to perform static analysis, dynamic analysis, runtime analysis, or any combination thereof.

Once the data detector service determines a set of likely languages (which may be a set of one) used in the cloned repository, the centralized repository security service is configured to select at least one image from the image store that, when instantiated or otherwise spun up, provides access to an instance of a static analysis tool configured to perform static analysis against the language or syntax identified by the output of the data detector service. For example, in one embodiment, the image store may contain three images: a first image packages a first static analysis tool configured to detect issues in Objective-C code; a second image packages a second static analysis tool configured to detect issues in Python code; and a third image packages a third static analysis tool configured to detect issues in Python, Javascript, HTML, CSS, and PHP code. In this example, the cloned repository may contain code associated with a client-server software application that includes HTML code, CSS code, PHP code, and Python code. In this example, the data detector service determines (e.g., via file extension analysis) that the cloned repository includes code in HTML, CSS, PHP and Python and provides an output identifying each language. Based on this output, the centralized repository security service queries the image store for images suitable to detect issues in the languages identified by the data detector service. In response, in this example, the image store returns the second image and the third image.

Once at least one image is selected or otherwise obtained from the image store, the centralized repository security service leverages a suitably-configured orchestrator to provide the local path of the cloned repository as input to each selected image obtained from the image store based on the output of the data detector service.

Thereafter, the orchestrator causes the spin up of each selected image (as instantiated containers, booted virtual machines, and the like) each of which, in turn, performs at least one static analysis task based on the cloned repository found by the spun-up image at the local path supplied by the orchestrator.

As each instance of each container or virtual machine spun up by the orchestrator completes each static analysis task, results of each task (i.e., any identified issues) are received and stored in a result store database. In typical embodiments, each identified issue is keyed to, or otherwise associated with, a commit identifier ("commit id") that identifies a particular version (and associated commit/change history) of the cloned repository. In this manner, each static analysis operation output (i.e., each issue) can be added to, or otherwise associated with, a graph storing change history for the cloned repository. In other cases, results of static analysis operations can be keyed to, or hashed with, a line number identified by content of a given issue. In this example, each static analysis operation output can be associated with, and/or otherwise tied to, specific lines of specific files of the cloned repository.

As noted above, each result of each static analysis operation output (identifying at least one issue) by each respective container or virtual machine instantiated by the orchestrator is stored in the result store database ("result store"). Prior to storing results of a given static analysis operation in the result store, the centralized repository security service can be configured to normalize the form, format, or content of raw output from each container or virtual machine.

Additionally, the centralized repository security service can be configured to de-duplicate and/or merge substantially similar results output from the same or different static analysis tools. In this manner, all data stored in the result store may be unique and can be stored in, and accessible in, the same format, regardless of the static analysis tool that generated the original raw data. A person of skill in the art may appreciate that various data normalization and format unification techniques, or a combination thereof, may be leveraged by the centralized repository security service to normalize output(s) of different static analysis tools to conform to a common format expected by the result store.

In many embodiments, a job status identifier is also stored in the result store or another database of the centralized repository security service. The job status identifier may indicate whether all static analysis operations to be performed on the cloned repository have completed (successfully or otherwise). The job status identifier can further include information such as, but not limited to: percent completion of all static analysis operations; percent completion of all static analysis operations performed by a particular container or virtual machine; number and/or identity of static analysis operations that completed successfully; number and/or identity of static analysis operations that did not complete successfully; number of problems, issues, or other warnings identified by one or more static analysis tools; and so on. As with other transacted data described herein, the job status identifier can be stored in any suitable form or format and can contain any suitable data.

As a result of the foregoing described architecture, a client application coupled to a host server of a collaborative software development environment, such as described herein, can be configured to query the result store of the centralized repository security service for one or more of (1) a job status identifier and/or (2) one or more static analysis results (i.e., issues) which, in turn, can be displayed to a user/developer to inform that user/developer of issues in the user's code. In some examples, issues identified by centralized repository service can be added to a graph or other hash tree based on a hash of the identified issue, the tool that identified the issue, or any other suitable information. As a result of this construction, a user/developer can be presented with a graphical user interface to mark whether issues identified by the system are false positive issues. In these examples, the hash(es) associated with each identification of each issue can be leveraged by the system as a whole to prevent display of issues that have already been marked by at least one user as a false positive.

An example follows from a perspective of a user of a collaborative software development environment that implements a centralized repository security service, such as described herein. The collaborative software development environment includes a host server that communicates with a client application executed by a client device operated by the user. The user interacts with a user interface rendered by the user's client device executing the client application to clone a repository hosted by the host server.

In this example, the repository contains only Python code. The user makes changes to the user's local copy of the Python repository and submits a pull request, via the client application, to the host server. When the pull request is received by the host server, a repository event is created and the centralized repository security service is thereby notified that a new pull request has been submitted (to a repository identified by a payload of the repository event). In response to receiving the repository event, the centralized repository security service clones the repository, and pulls the user's changes to a path or location local to, or otherwise accessible to, the centralized repository security service.

After the repository (including the user's changes) has been cloned to the path, the centralized repository security service leverages a data detector service to determine what language(s) or syntax(es) are used in the cloned repository at the specified path. In response, the data detector service provides an output that indicates only Python code is used. Based on this information, the centralized repository security service retrieves (via any suitable query method) any or all images stored in an image store that are tagged with a tag "Python."

Once the Python-specific set of images is retrieved, the centralized repository security service leverages an orchestrator to spin up each image and to provide as input to each image the path of the cloned repository that includes the user's changes. In parallel (or, in some examples, in a sequence), each spun-up image executes at least one Python-oriented static analysis task. As such tasks complete, issues identified by any of the static analysis tools packaged by the spun-up images, are reformatted into a unified format, associated with at least a line number or a file name, and are stored in a result store. As noted above, individual issues identified by specific tools can be hashed together and stored in a graph or other data structure such that false positives can be readily identified and not shown or stored again.

In this example, once the user submits the pull request, a progress indicator can be shown to the user indicating that a security/vulnerability check has been queued and/or is in process. In some embodiments, the client application may be configured to automatically initiate periodic requests including a job status identifier (associated with the user's pull request and/or function(s) of the centralized repository security service initiated in response thereto) to the result store of the centralized repository security service.

Once all tasks of the centralized repository security service are complete, any issues identified by any of the images spun up in response to the user's pull request can be shown to the user via the user interface rendered by the client application. For example, a shortened description of the identified issue can be displayed alongside an arrow, underline, or other text decoration linking that description to a particular line, phrase, or item of text in a source code file.

In other cases, the user may be notified of issues in another manner, such as via email, text message, or application notification. In still other examples, other individuals (supervisors, colleagues, and so on) associated with the repository may be notified using any suitable notification channel or technique. In still further examples, other operations or tasks may be initiated automatically such as, but not limited to: generating by the centralized repository security service a pull request automatically addressing one or more issues; communicating from the centralized repository security service to an issue tracking system that one or more tickets should be opened in response to the issues identified by the centralized repository security service; creating a new bug report in the repository referencing the user's pull request; calculating by the centralized repository security service a score or other evaluation of the user's pull request based on, without limitation, severity of identified issues, predicted complexity associated with fixing identified issues, evaluation of prevalence or frequency of occurrence of any identified issues, the number of issues tagged as false positives (and by what users), and so on.

As a result of the above-described architecture, any change made (or proposed) by any user/developer to any given repository of a collaborative software development environment is automatically and asynchronously analyzed by any number of suitable third-party or first-party static analysis tools. Advantageously, no installation, configuration, licensing, or maintenance is required on any client device and, additionally, because a centralized repository security service described herein operates in an event-driven asynchronous manner, no blocking analysis delay is injected into any user/developer's workflow. In other cases, blocking may be intentionally injected to prevent a user from merging a particular change or pull request (e.g., a change of high sensitivity or otherwise marked as high priority) into a production or other codebase.

Furthermore, as a result of the above-described architecture, a single individual or limited team can be tasked with updating images and/or virtual machines in the image store. As a result of this construction, whenever a third-party or first-party static analysis tool receives an update, that update need only be applied in a single location—namely, in the image store. Once the update is applied, the updated static analysis tool can be immediately leveraged by any software development team using the collaborative software development environment. In another example, an updated image of a given static analysis tool can be used alongside an older version of the same tool packaged in a separate image stored in the image store.

Further, as a result of an event-driven architecture, a centralized repository security service such as described herein is readily scalable (in some examples, on demand) to perform static analysis operations on any suitable number of code repositories of an organization.

Further still, as a result of the availability of a centralized repository security service to perform static analysis operations (using the most suitable first-party or third-party static analysis tools) against all repositories of a given organization, said organization can leverage the result store to periodically audit the entire organization's codebase for security issues, information disclosure issues, and the like.

As such, generally and broadly, an organization leveraging a collaborative software development environment can implement a centralized repository security service, such as described herein, to perform static analysis using any number of different first-party or third-party static analysis tools against all repositories of that organization without requiring configuration, installation, licensing, or maintenance on a per-user, per-project, or per-repository basis. Further still, a centralized repository security service, such as described herein, can be triggered in response to any specified repository events and, as a result, may operate automatically alongside development activity to perform static analysis each time a specified event—such as a pull request—occurs. In still other configurations, a centralized repository security service can be configured to run, additionally or alternatively, on a schedule.

These foregoing and other embodiments are discussed below with reference to FIGS. 1-6. However, those skilled in the art will readily appreciate that the detailed description given herein with respect to these figures is for explanatory purposes only and should not be construed as limiting.

Figure 1:
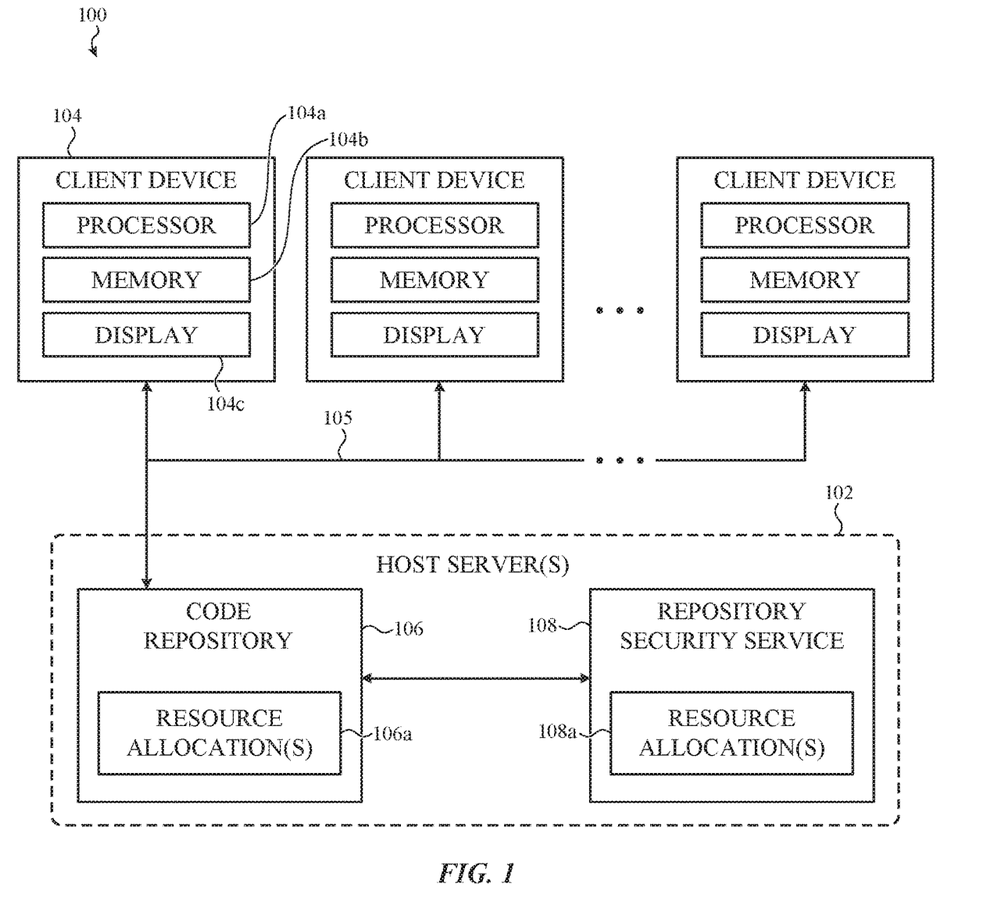
FIG. 1 is a schematic representation of a collaborative software development environment including a centralized repository security service, such as described herein.

FIG. 1 is a schematic representation of a portion of an example collaborative software development environment, such as described herein. It may be appreciated that the example environment depicted in FIG. 1, identified as the collaborative software development environment 100, may be suitably configured to perform any operation described herein, including those functions, operations, and steps described above or below without specific reference to the enumerated elements of FIG. 1 or to the drawing itself. For brevity, such examples are not repeated here with specific reference to FIG. 1. Instead, it is appreciated that example embodiments presented elsewhere herein can be effectuated by the collaborative software development environment 100, depicted in FIG. 1; nothing described herein should be construed as limiting the disclosure or claims to only those examples presented with direct reference to the figures, including FIG. 1.

In the illustrated embodiment, the collaborative software development environment 100 is implemented with a client-server architecture including a host server 102 that communicably couples (e.g., via one or more networking or wired or wireless communication protocols) to one or more client devices, one of which is identified as the client device 104. It may be appreciated that other client devices may be configured in a substantially similar manner as the client device 104 (described below), although this may not be required of all embodiments and different client devices can be configured differently and/or may transact data or information with, and/or provide input(s) to and receive output(s) from, the host server 102 in a unique or device-specific manner.

The client device 104 can be any suitable personal or commercial electronic device and may include, without limitation or express requirement, a processor 104a, volatile or non-volatile memory (identified, collectively, as the memory 104b), and a display 104c. Example electronic devices include, but are not limited to: laptop computers; desktop computers; cellular phones; tablet computing devices; thin clients; and so on. It may be appreciated that a client device 104, such as described herein, can be implemented in any suitable manner.

In many embodiments, the processor 104a of the client device 104 can be configured to execute an application (herein referred to as a "client application") stored, at least in part, in the memory 104b. The client application is configured to access and communicate with the host server 102 and to securely transact information or data with, and provide input(s) to and receive output(s) from, the host server 102. In some embodiments, the client application may be a browser application configured to access a web page or service hosted by the host server 102 that is accessible to the client device 104 over a private or public network that may, in some embodiments, include the open internet. In other cases, the client application may be a native application.

In many embodiments, the host server 102 is configured to operate within or as a virtual computing environment that is supported by one or more physical servers including one or more hardware resources such as, but not limited to (or requiring) one or more of: a processor; a memory; non-volatile storage; networking connections; and the like. For simplicity of description and illustration, these example hardware resources are not shown in FIG. 1.

In many embodiments, the host server 102 can include a number of discrete subservices or purpose-configured modules, containers, or virtual machines each configured to perform, coordinate, serve, or otherwise provide one or more services, functions, or operations of the host server 102, such as the operations of (1) serving content of the collaborative software development environment 100, such as code repositories, from a database of the collaborative software development environment 100 to one or more client devices communicably coupled to the host server 102, and (2) operating a centralized repository security service, such as described herein. More specifically, the host server 102 can be configured to, without limitation: serve requests to access one or more code repositories; receive and/or generate one or more repository events in response to a change to one or more repositories tracked and/or otherwise monitored by the host server 102; respond to repository events by cloning an associated repository and pull changes that triggered each repository event; enqueue repository events received; operate a data detector server to detect one or more languages associated with a cloned repository; select one or more images from an image store based on the detected languages; leverage an orchestrator to instantiate one or more discrete static analysis tools by spinning up each selected image obtained from the image store; supply a path to the cloned repository to each image spun up by the orchestrator; receive results from completion or failure of one or more static analysis operations; normalize format of one or more results received as a result of completion or failure of one or more static analysis operations; store normalized results or issues in a result store; access the result store to determine a status of an analysis operation; and display for a client device a status and/or a result of a static analysis operation.

Embodiments described herein can configure a host server (e.g., the host server 102) in a number of suitable ways. In one embodiment, depicted in FIG. 1, the host server 102 of the collaborative software development environment 100 can include a code repository service 106 and a centralized repository security service 108. In these embodiments, the code repository service 106 can include one or more databases (e.g., repository databases) that store codebases and code repositories configured to be accessed by and/or otherwise displayed on a display of a client device, such as the display 104c of the client device 104.

In many embodiments, the code repository service 106 is configured to host a communication interface, such as an Application Programming Interface ("API") that may be accessed by one or more components or modules of the host server 102 and/or one or more remote devices, such as the client device 104. The API hosted by the code repository service 106 can gate or otherwise control access to content stored in the database(s) of the code repository service 106, including access to clone code repositories. For example, the code repository service 106 may respond only to authenticated queries to access code repositories.

As with other embodiments described herein, the centralized repository security service 108 of the host server 102 of the collaborative software development environment 100 can be configured in a number of suitable ways to, among other operations, perform asynchronous static analysis of code repositories stored by the code repository service 106 when such repositories change.

An example follows in which a first repository stored by the code repository service 106 contains only Swift and HTML code. In this example, a first user makes changes to a local copy of a Swift source file of the first repository and submits a pull request, via the client application, to the host server 102 requesting that the first user's change be merged with a production branch of the first repository.

Another user of the collaborative software development environment 100 can, at substantially the same time as the first user, make a change to an HTML file in a local copy (local to a client device operated by the second user) of the first repository. As with the first user, the second user submits a pull request, via another client application, to the host server 102 requesting that the second user's change be merged with the production branch of the first repository.

Another user of the collaborative software development environment 100 can, at substantially the same time as the first and second user, make a change to a Java file in a local copy (local to a client device operated by the second user)

of a second repository different from the first repository. As with the other two users, the third user submits a pull request, via another client application, to the host server 102 requesting that the third user's change be merged with the production branch of the second repository.

When each pull request of the three users is received by the host server 102, three separate repository events are created, enqueued, and distributed. In this example, the centralized repository security service 108 is thereby notified that the first and second repositories have been changed. In response to receiving each repository event (three separate events, in this example), the centralized repository security service 108 creates a first clone of the production branch of the first repository pulling the first user's changes at a first path. In addition, the centralized repository security service 108 creates a second clone of the production branch of the first repository pulling the second user's changes at a second path. Finally, the centralized repository security service 108 creates a third clone of the production branch of the second repository pulling the third user's changes at a third path.

For each of the cloned repositories, at the same time or in a sequence, the centralized repository security service 108 leverages a data detector service (not shown) to determine what language(s) or syntax(es) are used in the respective cloned repository at the specified path. In response, the data detector service provides an output that indicates what code language is used. In this example, the data detector service may be configured to output an indication that the first clone contains code in HTML and Swift (despite that the only changes made to the repository were in Swift, the repository itself, and thus the first clone, contains both languages), an indication that the second clone contains code in HTML and Swift, and that the third clone contains only Java.

Based on this information, the centralized repository security service 108 retrieves via any suitable query method any or all images stored in an image store that are tagged with the respective language(s) identified by the data detector service.

For each respective clone, once a respective set of images is retrieved, the centralized repository security service 108 leverages an orchestrator (not shown) to spin up each respective image and to provide as input to each image the path of the respective cloned repository that includes the respective user's changes. In parallel (or, in some examples, in a sequence), each spun-up image executes at least one static analysis task specific to the language defined by the data detector service. As such tasks complete, issues identified by any of static analysis tools packaged by the spun-up images are reformatted by the centralized repository security service 108 into a unified format, associated with at least a line number or a file name, and are stored in a result store after which the users' respective client applications can be notified to display the identified issues. In this example, the first user may be shown one or more issues in the altered Swift file, the second user may be shown one or more issues in the altered HTML file, and the third user may be shown one or more issues in the altered Java file. Each of these users may have an opportunity to mark the respective issue shown to each respective user as a false positive. In these examples, if a user marks an issue as a false positive, that issue may not be shown again to that user only, to the user's team, or to any user of an organization. As noted above, false positives can be identified based on a hash of a particular commit id (which may be associated with a change to a particular file at a particular time), a particular static analysis tool that identified the issue, a particular static analysis tool version, a particular line of a particular file, a particular user who last modified the file or line, and so on or any combination or sub-combinations thereof. Collectively, the data items that contribute to a hash of a particular issue can be referred to as a "fingerprint" of that issue that may be used in future operations to show or hide particular issues from particular users. As a result of these constructions, a team of developers can readily identify members of that team that consistently mark security issues as false positives.

Figure 3A:
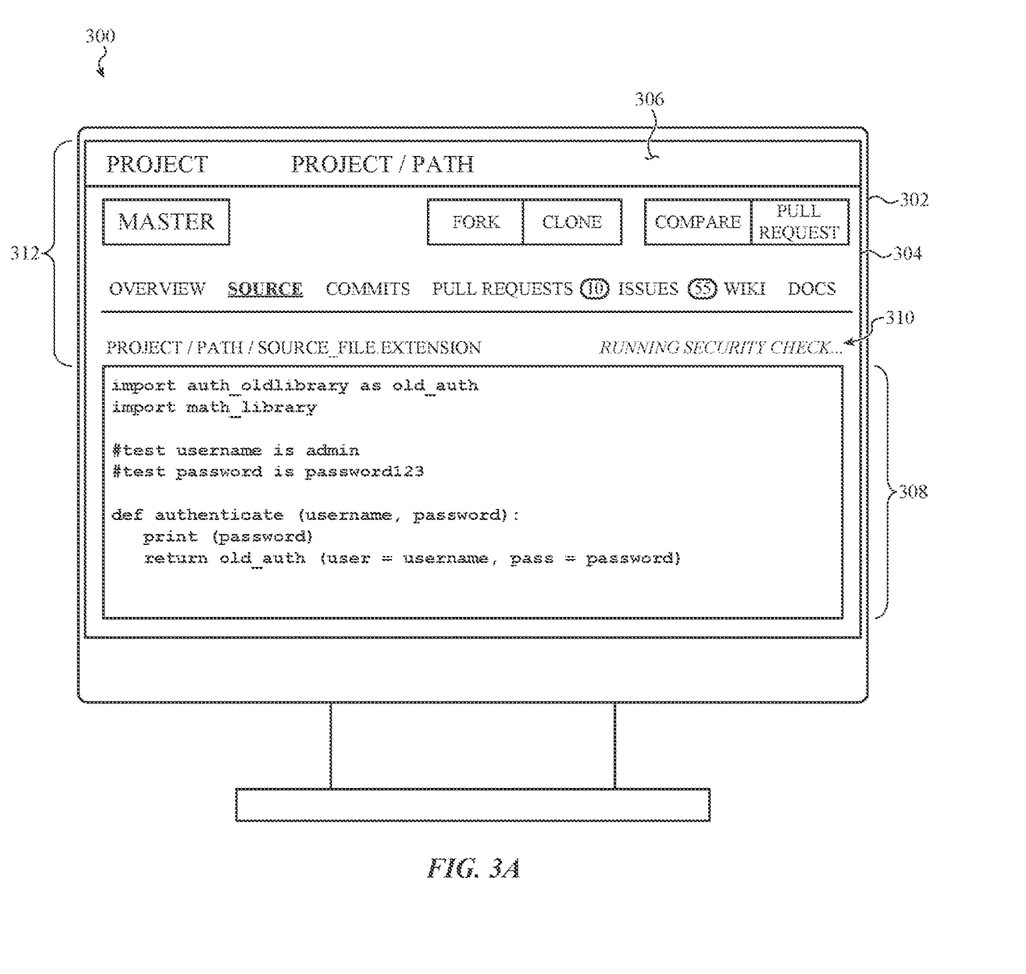
FIG. 3A depicts an example user interface that may be associated with a collaborative software development environment including a centralized repository security service, such as described herein.
Figure 3B:
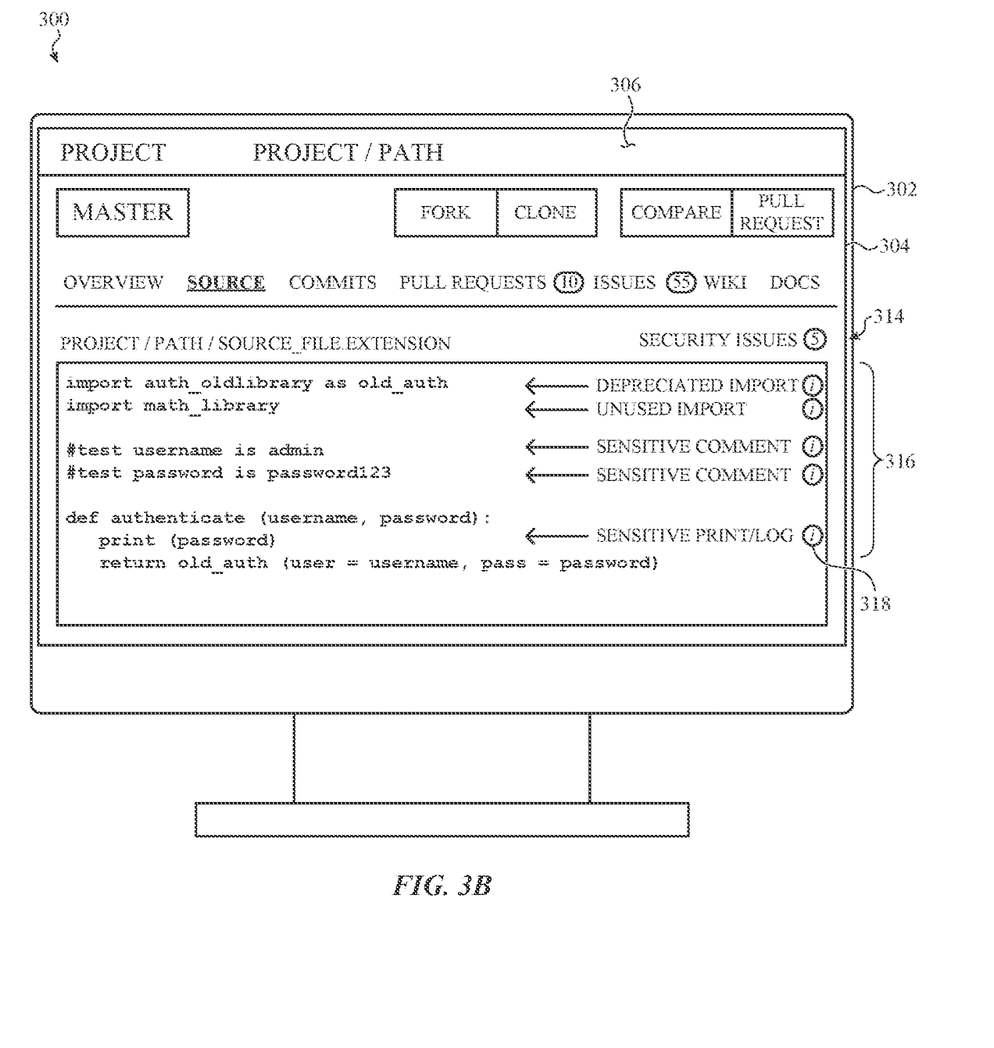
FIG. 3B depicts another example user interface that may be associated with a collaborative software development environment including a centralized repository security service, such as described herein.
Figure 4:
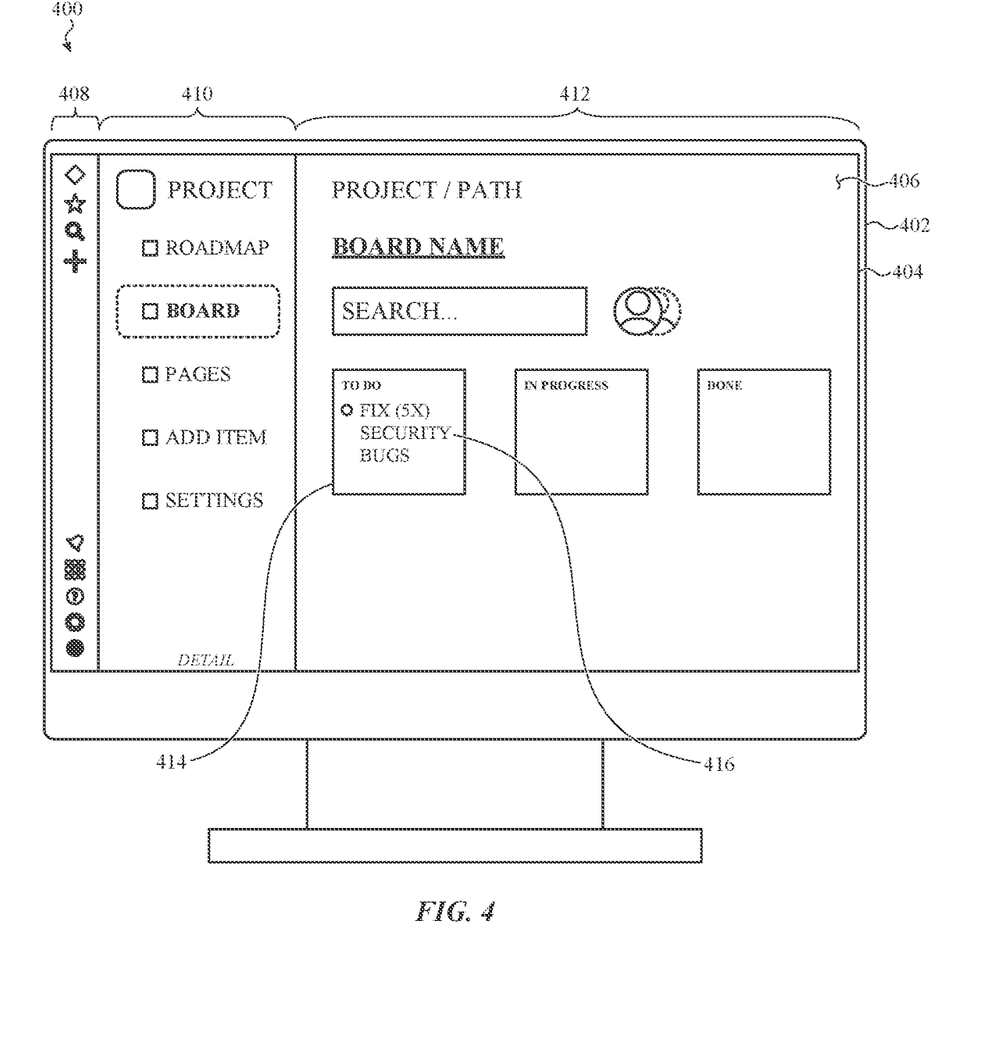
FIG. 4 depicts an example user interface that may be associated with a collaboration tool communicably coupled to a centralized repository security service, such as described herein.

The issues discovered by the centralized repository security service 108, such as described herein, can be displayed to a user in a number of suitable ways (see, e.g., FIGS. 3A-4). In some examples, a notification describing an issue and identifying a line number and a file name may be presented to a user via the client device/client application. In these examples the user can identify for the system whether a particular issue identified by the system was a false positive. In other cases, a given source file may be displayed with in-line insertions referencing issues discovered or otherwise detected by the centralized repository security service 108.

It may be appreciated that the foregoing examples are not exhaustive. More generally and broadly, it is appreciated that the collaborative software development environment 100 and in particular the centralized repository security service 108 of the collaborative software development environment 100 can be configured to operate in a number of suitable ways.

Accordingly, it is appreciated that the foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, the collaborative software development environment 100 of FIG. 1 can be implemented, architected, or configured in a number of suitable ways. As illustrated, the host server 102 includes one or more purpose-configured modules or components each configured to perform a discrete task associated with the operation of the collaborative software development environment 100.

In particular, as noted above, the host server 102 includes a centralized repository security service 108, and a code repository service 106. It may be appreciated that although these functional elements are identified as separate and distinct "servers" that each includes allocations of physical or virtual resources (identified in the figure as the resource allocations 106a and 108a respectively)—such as one or more processors, memory, and/or communication modules (e.g., network connections and the like)—that such an implementation is not required. More generally, it may be appreciated that the various functions described herein of a host server 102 can be performed by any suitable physical hardware, virtual machine, containerized machine, or any combination thereof.

The foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Figure 2:
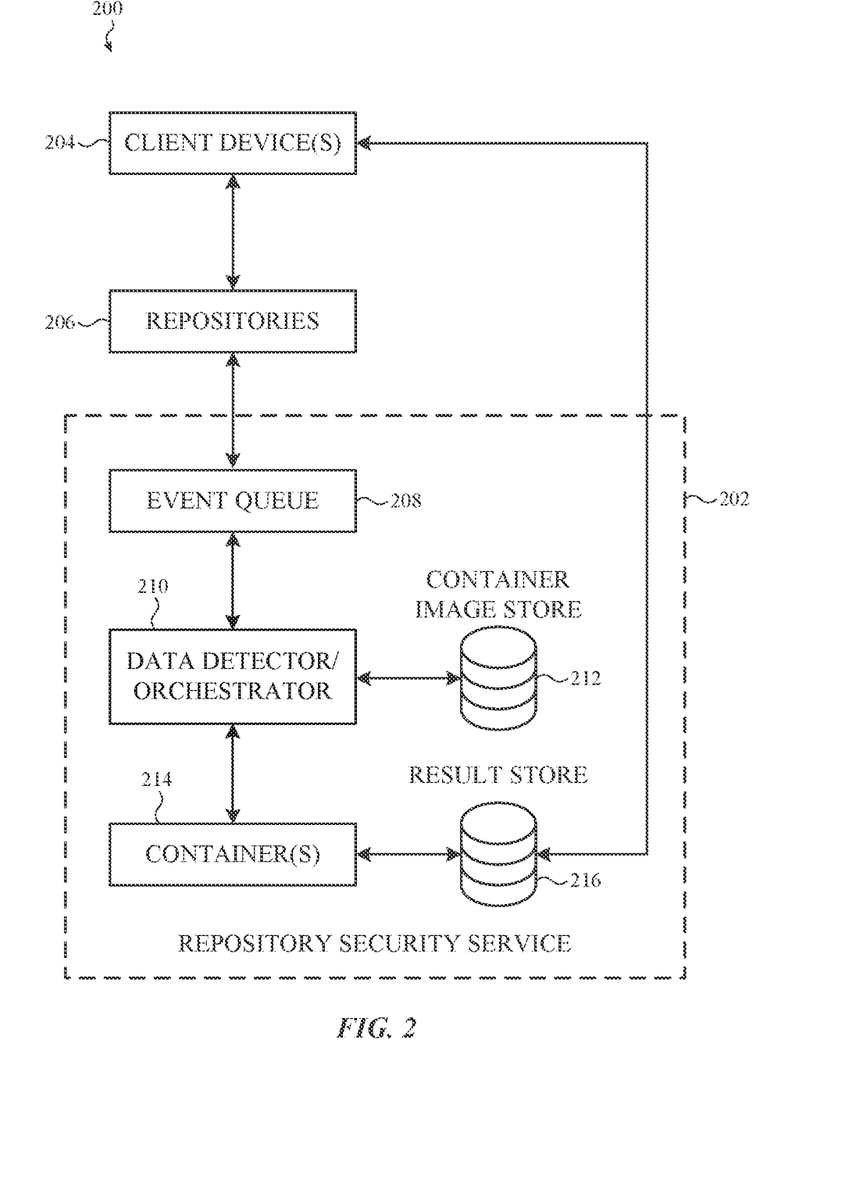
FIG. 2 is a system diagram of a centralized repository security service, such as described herein.

For example, FIG. 2 depicts a system diagram of a centralized repository security service, such as described herein. It may be appreciated that the example service depicted in FIG. 2, identified as the system 200, may be suitably configured to perform any operation described herein, including those functions, operations, and steps described above or below without specific reference to the enumerated elements of FIG. 2 or to the drawing itself. For brevity, such examples are not repeated here with specific reference to FIG. 2. Instead, it is appreciated that example embodiments presented elsewhere herein can be effectuated by the system 200, depicted in FIG. 2; nothing described herein should be construed as limiting the disclosure or claims to only those examples presented with direct reference to the figures, including FIG. 2.

The simplified system depicted in FIG. 2, the system 200, includes a centralized repository security service 202 (which may correspond to the repository security service 108 depicted in FIG. 1), a client device 204, and a repository database 206. As with other embodiments described herein, the client device 204 is configured to retrieve from the repository database 206 a clone of a selected repository. The client device 204 is further configured to submit changes to that repository, including additions and deletions. As noted with respect to other embodiments described herein, one example operation that can be performed by a client device such as the client device 204 is a pull request. Other operations to modify a repository stored in the repository database 206 are possible; a pull request is merely one example.

As with other embodiments described herein, once a change is pushed from the client device 204 to the repository database 206, a repository event may be generated. Example repository events can be configured to notify or otherwise indicate occurrence of: a pull request; a merge; a clone; a fork; and so on. The preceding examples are not exhaustive.

The centralized repository security service 202 subscribes to or otherwise consumes repository events. For example, as noted above, the centralized repository security service 202 can be implemented according to an event-driven architecture. In particular the centralized repository security service 202 includes an event queue 208 (also referred to as an event bus, an event dispatch, a message queue, and so on). The event queue 208 is configured to asynchronously receive and store discrete data items referred to as "events" formatted according to a specification or protocol unique to the centralized repository security service 202 and/or conforming with a specified messaging protocol.

In this example, the event queue 208 can receive events from the repository database 206 and store those events in a queue based on a time stamp or indexed order in which each event was received and/or added to the event queue 208. Thereafter, events stored by the event queue 208 can be consumed by one or more services, servers, microservices, functions, lambda functions, and so on associated with an operation or task of the centralized repository security service 202.

A data detector service and orchestrator 210 can consume events from the event queue 208. More specifically, as described with respect to other embodiments referenced herein, the data detector service and orchestrator 210 can parse a payload of an event to be consumed to determine an event type and, additionally, an associated repository. If the event type detected by the data detector service and orchestrator 210 is among a set of actionable event types (e.g., pull requests, merges, and so on), the data detector service and orchestrator 210 can clone the associated database to a path location local to the data detector service and orchestrator 210.

Thereafter, as noted with respect to other embodiments described herein, the data detector service and orchestrator 210 can determine, to a given degree or threshold level of confidence, what language, languages, or syntaxes appear within the cloned repository. Therewith, the data detector service and orchestrator 210 can obtain a suitable set of images from an image store 212. Once a suitable set of images is obtained, those images can be spun up as the containers 214 and pointed to the local directory at which the cloned repository associated with the received repository event resides. Once each container of the containers 214 completes its respective static analysis task, the results produced therefrom can be normalized and stored in a result store 216 which, in turn, can be accessed by the client device 204 at a later time to display to the user the results (and/or status) of static analyses performed on the repository modified by that user.

Such information can be shown to a user, or otherwise used, in a number of suitable ways. For example, FIG. 3A depicts an example user interface that may be associated with a collaborative software development environment including a centralized repository security service, such as described herein. In particular a client device 300 includes a display 302 having an active display area 304 that renders a graphical user interface 306. As noted with respect to other embodiments described herein, the graphical user interface 306 can be rendered in response to one or more operations of an instance of a client application executed by a processor of the client device 300.

In this example embodiment, the graphical user interface 306 can be configured to display information related to source code of a selected repository. For example, the graphical user interface 306 can include a source code snipped section 308 that displays at least a portion of a selected source code file.

As noted with respect to other embodiments described herein, a pull request initiated by a user of the client device triggers the centralized repository security service to begin the herein described operations of cloning the modified repository, selecting an appropriate set of images from an image store based on an analysis of what source code languages and/or types are used in the cloned repository, spinning up those selected images after pointing those images to the path or directory at which the cloned repository resides, and capturing results of execution of each selected image in a result store.

However, as noted above, while such operations are pending, the user of the client device may be presented with a status indicator 310 that conveys to the user that the process of evaluating security issues and/or other static analysis tasks is currently ongoing. In the illustrated example, the status indicator 310 is positioned within a header region 312 of the graphical user interface 306, but this is not required; the status indicator 310 can be positioned in any suitable location.

Once operations of the centralized repository security service have completed, the graphical user interface 306 may be updated to show or otherwise indicate the issues identified by the various static analysis tools selected and spun up by the centralized repository security service based on the repository itself. For example, FIG. 3B depicts the user interface of FIG. 3A modified to convey information regarding issues identified in the displayed source file to a user of the client device 300. In particular, in this example, a count of all security issues found is shown as an issue summary 314. In addition, on a line-by-line basis, individual issues are identified (shown as the issue identifiers 316). Each issue identified by the centralized repository security service can include a supplemental information dialog 318 that can be used by the user of the client device to receive more information about a particular issue. Similarly, each issue identified by the centralized repository security service can be marked as a false positive by a user. After being marked as a false positive, a fingerprint associated with the issue (e.g., a hash of an issue identifier, issue text, issue source, issue file name, line, and so on or any combination thereof) can be added to a false positive database so that a previously-marked issue is not shown in the future. In addition, the fingerprint can be leveraged to ensure that additional issue reports are not created in an issue tracking system.

In some cases, a false-positive user interface can be generated to show an administrator and/or other user which tools are generating which false positives and which users are marking false positives with greater frequency than others. A system administrator can leverage this information to determine whether to continue use of a particular tool and/or whether to inform a particular user or team that certain security issues should not be marked as false positives.

In still further embodiments, information output from a centralized repository security service, such as described herein, can be presented or used in a different manner. For example, FIG. 4 depicts an example user interface that may be associated with a collaboration tool (e.g., an issue or ticket tracking system) communicably coupled to a centralized repository security service, such as described herein. As with FIGS. 3A-3B, a client device 400 includes a display 402 that has an active display area 404 that depicts a graphical user interface 406. In this embodiment, the graphical user interface 406 is associated with an issue or ticket tracking system that can be configured to display to a user of the client device 400 information related to tasks assigned to that user, some of which may be related to a collaborative software development environment, such as described herein.

For example, the graphical user interface 406 can include multiple discrete sections 408, 410, 412 in which different granularities of information can be presented. In the illustrated embodiment, a section 412 of the graphical user interface 406 can be configured to display a task list 414 comprising tasks assigned to the user. In this example, the issue or ticket tracking system can be communicably coupled to a centralized repository security service, such as described herein, to automatically add the task 416 to the user's task list. In other words, in this embodiment, a centralized repository security service can be leveraged by any suitable software package to display information to a user related to that user's software development work product. In the illustrated embodiment, a task list for the user can be updated in response to changes in a result database of a centralized repository security service, such as described herein.

Figure 5:
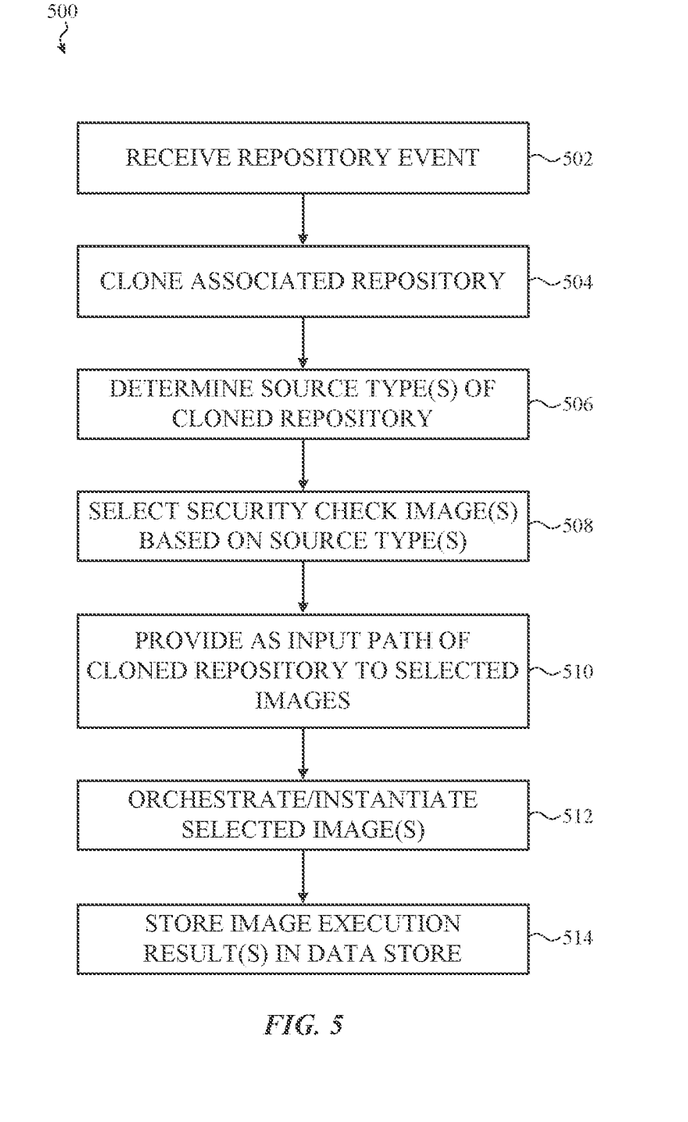
FIG. 5 is a flow chart that depicts example operations of a method of operating a centralized repository security service, such as described herein.
Figure 6:
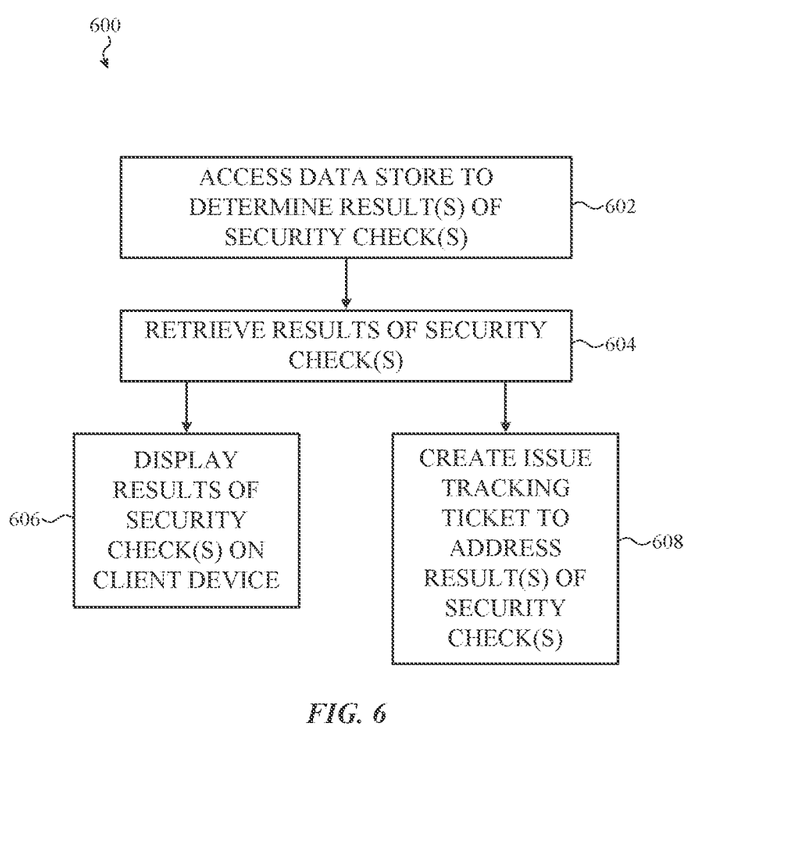
FIG. 6 is a flow chart that depicts example operations of another method of operating a centralized repository security service, such as described herein.

Generally and broadly, FIGS. 5-6 depict flow charts of example operations of example methods of operating a centralized repository security service, such as described herein. It may be appreciated that these simplified examples are not exhaustive and, in some cases, additional or alternative operations or operation order can be used.

FIG. 5 is a flow chart that depicts example operations of a method of operating a centralized repository security service, such as described herein. The method 500 can be performed, in whole or in part, by a centralized repository security service such as described herein. The centralized repository security service performing the method 500 can, as noted above, can be implemented on any suitable combination of hardware or software, whether virtualized or physical.

The method 500 includes operation 502 at which a repository event is received. As noted with respect to other embodiments described herein, a repository event can be a user-specific and/or project-specific event that signifies or otherwise marks that a change to a code repository has occurred. In many embodiments, a pull request is an example of a repository event received at operation 502, but it may be appreciated that this is merely one example; other repository events may be possible or selected in other implementations. In many embodiments, the operation 502 further includes an authorization and/or authentication step in which the centralized repository security service identifies itself to a repository server as an authorized account to receive repository events and/or as authorized to clone or otherwise copy one or more specific repositories. Phrased in another manner, operation 502 may further include a step in which the centralized repository security service submits an authorization request to a repository server that, in response, can permit the centralized repository security service to receive repository events for a subset or all of repositories with which the centralized repository security service is authorized to interact.

The method 500 includes operation 504 at which a payload of the repository event received at operation 502 is parsed. In particular, the payload may be parsed to determine a repository associated with the event. In some cases, a name of the repository may be included in the payload. In other cases, an identifier referring to the repository in another manner may be used. In some cases, a path of the repository may be used. It may be appreciated that regardless the manner by which the method 500 or the operation 504 obtains an indication of the repository, after such an operation completes, the target repository may be cloned or otherwise duplicated to a local directory.

As with the operation 502, the operation 504 may further include an authorization step, or operation, in which the centralized repository security service performs an authorization step prior to cloning or attempting to clone the repository identified by the event received at operation 502. In some embodiments, authorization may not be required; the centralized repository security service may be authorized by a respective repository server to access and receive events related to any repository stored by the respective repository server.

The method 500 includes operation 506 at which the cloned repository or, more specifically, the path of the cloned repository, can be supplied as input to a data detector service configured to, as described above, determine a likely language, languages, and/or syntax associated with or otherwise used by the various source files of the cloned repository. More generally and broadly, the operation 506 may determine a source type of the cloned repository using any suitable source identification method.

Example source identifications methods include, but are not limited to: file extension analysis; file content analysis; include/dependency analysis; framework analysis; library analysis; code syntax analysis; comment content; documentation content; wiki content; source author; project type; project tags; and so on.

The method 500 includes operation 508 at which one or more images may be selected based on the source type(s) identified at operation 506. In particular, as noted above, one or more images, also referred to as "security check images," may be selected from an image database. As with the operation 502 and 504, in some embodiments, the centralized repository security service can be configured to perform an authorization operation. In these examples, however, the centralized repository security service may be configured to determine whether a license to use one or more of the security check images is complied with if used to perform a static analysis operation against the cloned repository. For example, in some cases, one or more of the security check images may be operated under a single-use license, meaning that the image can only be used to perform analysis of a single codebase at any given time. In these examples, the centralized repository security service may determine that if the security check image is "busy," that a particular security check also requiring access to the same image be delayed until the image is available. In other cases, the centralized repository security service may perform an authorization operation in response to content of the repository event itself. For example, in some embodiments, only certain users of the collaborative software development environment may be authorized to utilize certain security check images. In these examples, the centralized repository security service can be configure to verify whether a particular selected security check image can be used to perform a static analysis operation against a pull requests submitted by a particular user.

The method 500 includes operation 510 at which the path of the cloned repository is provided as input to each of the images identified at operation 508. For example, in some embodiments, the expanded path of the cloned repository is supplied as an argument to each of the selected images. In other cases, an alias, symbolic link, or other file association can be created or modified to point to the cloned repository. In these examples, each cloned image can be configured to access the cloned repository (e.g., as a bound volume, as a linked volume, and so on)

The method 500 includes operation 512 at which an orchestrator is leveraged to spin up or otherwise instantiate each image selected at operation 508 and configured at operation 510. As noted with respect to other embodiments described herein, once said images are spun up, one or more static analysis operations can be performed.

The method 500 includes operation 514 at which results of execution of the images at operation 512 are stored in a result store, which may be a database accessible to a centralized repository security service, such as described herein. Thereafter, results of these executions can be analyzed, normalized, or otherwise utilized to inform one or more actions or behaviors of the centralized repository security service or the repository service. In other examples, the results can be accessed from the results data store in order to display to a user via a client application, such as described herein.

Thereafter, information contained in the result store can be accessed at a later time to determine existence or absence of issues in a given source codebase.

FIG. 6 is a flow chart that depicts example operations of another method of operating a centralized repository security service, such as described herein. As with the method 500, the method 600 can be performed by any suitable software or hardware combination implementation of a centralized repository security service, such as described herein. The method 600 includes operation 602 at which a data store, such as a result store, is accessed by a device, such as a client device, to determine the results of a previously-conducted security check or, more generally, a previously-conducted static analysis. Next, at operation 604 the results of such an operation can be obtained from the database. The method further includes operation 606 occurring after 604, which causes to be displayed the results obtained at operation 604 on a display of a client device. Alternatively, or additionally, the method includes operation 608 occurring after operation 604 which causes to be generated a new trouble ticket, task, bug report, or other "issue" to be tracked in response to the results obtained at operation 604.

It is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Accordingly, one may appreciate that, although many embodiments are disclosed above, the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A system for asynchronous static analysis in a collaborative software development environment, the system comprising:
at least one server comprising a memory allocation storing executable instructions and a hardware processor allocation configured to access the executable instructions from the memory allocation to instantiate:
a repository service comprising a repository database that stores a source repository; and
a repository security service communicably coupled to the repository service and configured to:
clone a selected branch of the source repository from the repository database to a local directory, local to the repository security service, as a cloned repository;
analyze at least one source file of the cloned repository to determine a first and a second property of the cloned repository;
select a first image from an image database, the first image packaging a first static analysis tool configured to perform a first static analysis operation associated with the first property;
select a second image from the image database, the second image packaging a second static analysis tool configured to perform a second static analysis operation different from the first static analysis operation, the second static analysis operation associated with the second property;

provide as input to the first image and the second image a pointer to the local directory;

instantiate the first image and the second image to initiate the first static analysis operation against the cloned repository and instantiate the second static analysis operation against the cloned repository;

store results of the first and second static analysis operation in a result database; and cause to be displayed at a client device in communication with the collaborative software development environment, an indication whether the source repository passes or fails, the indication based at least in part on static analysis results stored the results database.

2. The system of claim 1, wherein the repository security service is configured to communicably couple to a client application executed by a client device, the client application configured to submit a request to the result database to display at least one result of at least one completed static analysis operation in a graphical user interface of the client device.

3. The system of claim 1, wherein:
the repository security service is configured to receive a repository event from the repository service indicating a change has been made to the source repository; and
the repository event indicates the selected branch.

4. The system of claim 3, wherein the repository event comprises one or more of:
a pull request;
a merge; or
a commit.

5. The system of claim 3, wherein the repository event comprises a payload that indicates the selected branch.

6. The system of claim 1, wherein analyzing the cloned repository to determine the at least one property of the cloned repository comprises determining a file extension of at least one file of the cloned repository.

7. The system of claim 1, wherein the at least one image comprises one of a container or a virtual machine.

8. The system of claim 1, wherein the repository security service is configured to display results of each static analysis operation to a user of the system via a display of a client device communicably coupled to the repository security service.

9. A method for triggering static analysis of a repository, the method comprising:
detecting a change to the repository;
cloning the repository to a local directory local to a first service;
accessing the local directory, with the first service;
analyzing, with the first service, at least one respective file in the cloned repository to determine a respective code type of the at least one respective file; and
assigning a tag, by the first service, to the at least one respective file based on the respective code type;
instantiating a second service selected at least in part based on the tag;
determining, by the second service, for each at least one respective file in the cloned repository, whether the at least one respective file contains a software issue; and
storing each determined security vulnerability in a database.

10. The method of claim 9, wherein:
the first service comprises a data detector configured to determine a computing language of the at least one respective file; and
the tag is based on the determined computing language.

11. The method of claim 9, wherein the second service is a containerized static analysis tool configured to perform static analysis of source code files of the respective code type of the at least one respective file.

12. The method of claim 9, wherein the second service is instantiated from an image stored in an image database.

13. The method of claim 9, wherein:
the second service is instantiated by an orchestrator that receives as input the tag; and
selects an image corresponding to the tag from an image database, the image comprising instructions to instantiate the second service.

14. The method of claim 9, wherein detecting the change to the repository comprises receiving an event comprising a pull request.

15. The method of claim 14, wherein cloning the repository to the local directory comprises pulling one or more changes associated with the pull request to the local directory.

16. The method of claim 9, wherein analyzing, with the first service, the at least one respective file in the cloned repository to determine the respective code type of the at least one respective file comprises determining a file extension of the at least one respective file.

17. A system for asynchronous static analysis of a source repository, the system comprising:
at least one server comprising a hardware processor allocation configured to access executable instructions from a memory allocation to instantiate:
an event queue for receiving a repository event indicating a change to the source repository;
a data detector service for determining a computing language used by the source repository indicated by the repository event;
an image store configured to store images, each image packaging a respective static analysis tool configured to perform a respective static analysis operation against at least one computing language;
an orchestrator for selecting at least two images from the image store in based on the computing language used by the source repository as determined by the data detector service, the orchestrator further configured to instantiate each selected image such that each instantiated image initiates the respective static analysis operation against the source repository; and
a result store for receiving and storing results of execution of each initiated respective static analysis operation.

18. The system of claim 17, wherein the results of execution of each initiated respective static analysis operation are normalized to a common format prior to storing in the result store.

19. The system of claim 17, wherein the data detector service is configured to clone the source repository to a local directory prior to determining the computing language used by the source repository indicated by the repository event.

20. The system of claim 17, wherein the repository event is received from a repository service in communication with the event queue.

* * * * *

UNITED STATES PATENT AND TRADEMARK OFFICE
CERTIFICATE OF CORRECTION

PATENT NO. : 11,157,591 B2  
APPLICATION NO. : 16/854593  
DATED : October 26, 2021  
INVENTOR(S) : Adams et al.

Page 1 of 1

It is certified that error appears in the above-identified patent and that said Letters Patent is hereby corrected as shown below:

On the Title Page

At (72) Inventors, delete "Mark Adams, San Francisco, CA (US)" and insert --Mark Adams, Austin, TX (US)--.

At (72) Inventors, delete "Erin Jensby, Plano, TX (US)" and insert --Erin Jensby, Austin, TX (US)--.

Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*